US012614424B2

(12) United States Patent
Jang et al.

(10) Patent No.: US 12,614,424 B2
(45) Date of Patent: Apr. 28, 2026

(54) MEDIUM STORAGE DEVICE AND METHOD OF CONTROLLING THE MEDIUM STORAGE DEVICE

(71) Applicant: HYOSUNG TNS INC., Seoul (KR)

(72) Inventors: Hyun Soo Jang, Seoul (KR); Jun Young Kim, Seoul (KR); Jin Yu Lim, Seoul (KR); Dahye Shin, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 178 days.

(21) Appl. No.: 18/258,402

(22) PCT Filed: Feb. 22, 2022

(86) PCT No.: PCT/IB2022/051534
§ 371 (c)(1),
(2) Date: Jun. 20, 2023

(87) PCT Pub. No.: WO2022/137223
PCT Pub. Date: Jun. 30, 2022

(65) Prior Publication Data
US 2024/0038013 A1 Feb. 1, 2024

(51) Int. Cl.
*G07D 11/24* (2019.01)
*B65H 31/22* (2006.01)
(Continued)

(52) U.S. Cl.
CPC ............. *G07D 11/18* (2019.01); *B65H 31/22* (2013.01); *G07D 11/12* (2019.01); *G07D 11/14* (2019.01);
(Continued)

(58) Field of Classification Search
CPC ........ B65H 31/22; G07D 11/18; G07D 11/12; G07D 11/22; G07D 11/245; G07D 11/25;
(Continued)

(56) References Cited

U.S. PATENT DOCUMENTS 5,256,862 A 10/1993 Watanabe et al.
10,109,134 B2 * 10/2018 Jeong .................... G07D 11/50
(Continued)

FOREIGN PATENT DOCUMENTS

JP 4387456 B1 12/2009
JP 2013125438 A * 6/2013
(Continued)

OTHER PUBLICATIONS

Office Action in Russian Application No. 2023116652 dated Dec. 22, 2023 and English translation thereof.
(Continued)

*Primary Examiner* — Luis A Gonzalez
(74) *Attorney, Agent, or Firm* — BACON&THOMAS,PLLC

(57) ABSTRACT

A medium storage device to which a transit cassette including a reject cassette part for storing a rejection medium and a medium cassette part for storing a medium is connectable, includes: a safe having an entrance for replenishment and recovery to which the transit cassette is selectively connected; an identification unit serving to identify whether a medium is a normal medium or the rejection medium; a recycle cassette configured to store the medium identified as the normal medium; a conveyance path configured to convey the medium between the entrance for replenishment and recovery, the identification unit and the recycle cassette; and a control unit configured to control the conveyance path such that the medium stored in the medium cassette part is conveyed to the identification unit, and the medium identified as the normal medium in the identification unit is conveyed to the recycle cassette.

9 Claims, 7 Drawing Sheets

(51) Int. Cl.

| | |
|---|---|
| ***G07D 11/12*** | (2019.01) |
| ***G07D 11/14*** | (2019.01) |
| ***G07D 11/18*** | (2019.01) |
| ***G07D 11/22*** | (2019.01) |
| ***G07D 11/245*** | (2019.01) |
| ***G07D 11/25*** | (2019.01) |
| ***G07F 19/00*** | (2006.01) |

(52) U.S. Cl.
CPC ........... *G07D 11/22* (2019.01); *G07D 11/245* (2019.01); *G07D 11/25* (2019.01); *G07F 19/204* (2013.01); *G07D 2211/00* (2013.01)

(58) Field of Classification Search
CPC ....... G07D 11/24; G07F 19/20; G07F 19/205; G07F 19/203; G07F 19/202
See application file for complete search history.

(56) References Cited

U.S. PATENT DOCUMENTS

| | | | | |
|---|---|---|---|---|
| 2010/0245043 | A1* | 9/2010 | Doi | G07D 11/50 340/5.86 |
| 2014/0332340 | A1* | 11/2014 | Adachi | G07D 11/50 194/206 |
| 2015/0243119 | A1* | 8/2015 | Hayashi | G07D 11/14 194/206 |
| 2019/0172292 | A1* | 6/2019 | Fukuda | G07D 11/18 |
| 2021/0125449 | A1* | 4/2021 | Fukuda | G07D 11/245 |
| 2021/0192038 | A1* | 6/2021 | Shibata | G06F 21/575 |
| 2022/0108580 | A1* | 4/2022 | Hamada | G07D 11/13 |

FOREIGN PATENT DOCUMENTS

| | | | |
|---|---|---|---|
| JP | 5821604 | B2 | 11/2015 |
| JP | 2019-152905 | A | 9/2019 |
| KR | 10-1226298 | B1 | 1/2013 |
| KR | 102016-0105038 | A | 9/2016 |
| KR | 10-2016-0139764 | A | 12/2016 |
| KR | 10-1764480 | B1 | 8/2017 |
| KR | 10-20200124418 | A | 4/2018 |
| KR | 10-20200037685 | A | 4/2020 |
| WO | 2010/109606 | A1 | 9/2010 |
| WO | WO2020-218697 | A1 | 10/2020 |

OTHER PUBLICATIONS

International Search Report issued in corresponding International Appln. No. PCT/IB2022/051534 dated Jun. 9, 2023.

Extended European Search Report in European Application No. 22733280.6 dated Oct. 25, 2024.

* cited by examiner

MEDIUM STORAGE DEVICE AND METHOD OF CONTROLLING THE MEDIUM STORAGE DEVICE

TECHNICAL FIELD

The present disclosure relates to a medium storage device and a method of controlling the medium storage device.

BACKGROUND ART

In general, an automated teller machine is an unmanned terminal that enables the deposit and withdrawal of mediums such as cash or checks without time restriction through the use of a cash card or a passbook.

Such an automated teller machine may have a medium storage box that may store mediums such as cash or checks, and a proper amount of mediums may be stored in the medium storage box. A medium stored in the medium storage box may be taken out of the medium storage box by a customer's request for withdrawal, and a new medium may be carried into the medium storage box by a customer's request for deposit. As such, a proper amount of the mediums stored in the medium storage box need to be maintained in preparation for the customer's request for deposit or withdrawal, and it is necessary to manage and monitor whether a proper amount of mediums are stored in the medium storage box in real time.

However, when a management company for replenishing the automated teller machine with mediums is far away from the automated teller machine, it is not easy for the management company to manage the amount of mediums in the automated teller machine in real time.

For example, in the case that a specific type of banknotes are insufficient in the automated teller machine, the automated teller machine may be replenished with the specific type of banknotes through a customer's deposit while a person of the management company goes to replenish the machine with the specific type of banknotes. Further, in the case that a specific type of banknotes is sufficient in the automated teller machine, the specific type of banknotes may be depleted in the automated teller machine through a customer's withdrawal while a person of the management company goes to replenish the machine with a different type of banknotes.

Meanwhile, a conventional medium storage device is problematic in that it is difficult to selectively take only a specific type of banknotes which need to be replenished among various types of banknotes out from a transit cassette, and to selectively take a desired number of banknotes which need to be replenished from the transit cassette. Therefore, there is a need for a medium storage device capable of replenishing a desired type of banknotes and a desired number of banknotes from a transit cassette that stores various types of banknotes, and transferring an unnecessary type of banknotes back to the transit cassette.

DISCLOSURE OF INVENTION

Technical Problem

In view of the above, the present disclosure provides a medium storage device and a method of controlling the medium storage device, which are capable of replenishing or recovering a medium through the shortest path by separately arranging conveyance paths along which a normal medium and a rejection medium are conveyed to a transit cassette.

Solution to Problem

In accordance with a first aspect of the present disclosure, there is provided a medium storage device to which a transit cassette including a reject cassette part for storing a rejection medium and a medium cassette part for storing a medium is connectable, including: a safe having an entrance for replenishment and recovery to which the transit cassette is selectively connected; an identification unit serving to identify whether a medium is a normal medium or the rejection medium; a recycle cassette configured to store the medium identified as the normal medium; a conveyance path configured to convey the medium between the entrance for replenishment and recovery, the identification unit and the recycle cassette; and a control unit configured to control the conveyance path such that the medium stored in the medium cassette part is conveyed to the identification unit, and the medium identified as the normal medium in the identification unit is conveyed to the recycle cassette.

The control unit may control the conveyance path such that the medium identified as the rejection medium in the identification unit is conveyed to the reject cassette part of the transit cassette.

The medium storage device may further include: a reject cassette configured to store the rejection medium, wherein the control unit controls the conveyance path such that the medium stored in the recycle cassette is conveyed to the identification unit, the medium identified as the normal medium in the identification unit is conveyed to the medium cassette part of the transit cassette, and the medium identified as the rejection medium in the identification unit is conveyed to the reject cassette, The conveyance path may include: an upper conveyance path configured to provide a moving path of the medium input and output to and from the identification unit; a lower conveyance path connected to the upper conveyance path to form a closed loop; a second branch conveyance path providing a medium moving path between the lower conveyance path and the recycle cassette; a third branch conveyance path providing a medium moving path between the lower conveyance path and the reject cassette; a fourth branch conveyance path providing a medium moving path between the medium cassette part of the transit cassette and a front-side connection point of the upper conveyance path and the lower conveyance path; and a ninth branch conveyance path providing a medium moving path between the reject cassette part of the transit cassette and the front-side connection point of the upper conveyance path and the lower conveyance path.

The control unit may control the fourth branch conveyance path and the upper conveyance path such that a medium stored in the medium cassette part is conveyed to the identification unit, and controls the upper conveyance path, the lower conveyance path and the second branch conveyance path such that a medium identified as the normal medium in the identification unit is conveyed to the recycle cassette.

The control unit may control the upper conveyance path, the lower conveyance path and the ninth branch conveyance path such that a medium identified as the rejection medium in the identification unit is conveyed to the reject cassette part of the transit cassette.

The control unit may be configured to control the second branch conveyance path, the lower conveyance path and the upper conveyance path such that a medium stored in the recycle cassette is conveyed to the identification unit, control the upper conveyance path and the fourth branch conveyance path such that the medium identified as the normal medium in the identification unit is conveyed to the medium cassette part, and control the upper conveyance path, the lower conveyance path and the third branch conveyance path such that the medium identified as the rejection medium in the identification unit is conveyed to the reject cassette.

The reject cassette may be disposed in a lower front portion of the safe to be positioned adjacent to the transit cassette.

In accordance with a second aspect of the present disclosure, there is provided a method of controlling a medium storage device to which a transit cassette including a reject cassette part for storing a rejection medium and a medium cassette part for storing mediums is connectable, including: conveying a medium from the medium cassette part of the transit cassette to an identification unit; identifying whether the medium conveyed to the identification unit is a normal medium or a rejection medium; replenishing the medium, identified as the normal medium in the identification unit, to a recycle cassette; and conveying the medium identified as the rejection medium in the identification unit to the reject cassette part of the transit cassette.

Advantageous Effects of Invention

According to one embodiment of the present disclosure, mediums can be replenished or recovered through the shortest path by separately arranging the conveyance paths along which the normal medium and the rejection medium are conveyed to the transit cassette.

Further, according to one embodiment of the present disclosure, a medium can be stored in the recycle cassette through the identification unit from the medium cassette unit of the transit cassette, and a medium identified as the rejection medium by the identification unit can be conveyed to the reject cassette part of the transit cassette.

BEST MODE FOR CARRYING OUT THE INVENTION

Figure 1:
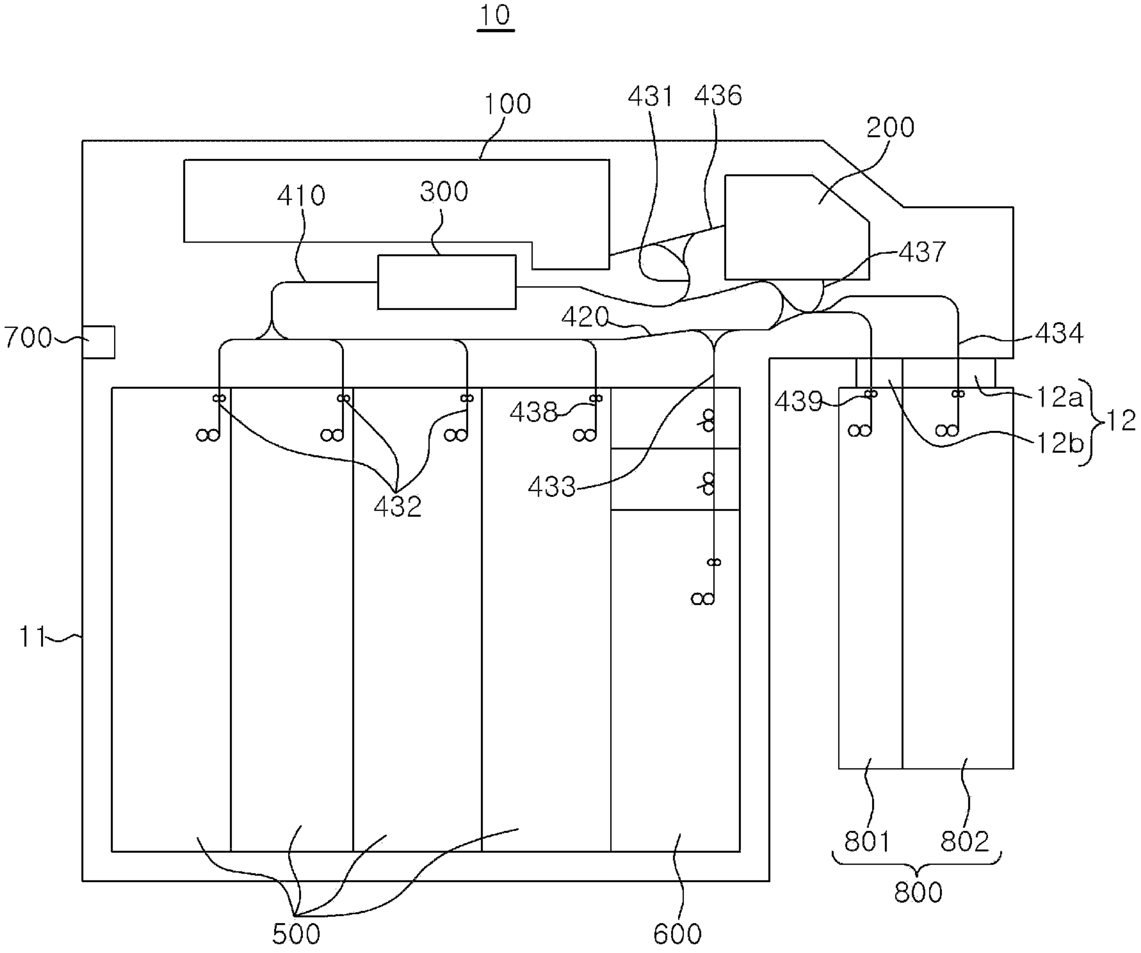
FIG. 1 is a diagram schematically illustrating the configuration of a medium storage device according to one embodiment of the present disclosure.

Hereinafter, configurations and operations of embodiments will be described in detail with reference to the accompanying drawings. The following description is one of various patentable aspects of the disclosure and may form a part of the detailed description of the disclosure.

In describing the embodiments of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various embodiments. Specific embodiments will be exemplarily illustrated in the drawings and described in the detailed description of the embodiments. However, it should be understood that they are not intended to limit the disclosure to specific embodiments but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components.

Specific terms in the present disclosure are used simply to describe specific embodiments without limiting the present disclosure. An expression used in the singular encompasses the expression of the plural, unless it has a clearly different meaning in the context.

Hereinafter, the specific configuration of a medium storage device 10 according to one embodiment of the present disclosure will be described with reference to the accompanying drawings.

As shown in FIGS. 1 to 5, with the medium storage device 10 according to one embodiment of the present disclosure, a medium in a medium cassette part 802 of a transit cassette 800 connected to a safe may be stored in a recycle cassette 500 in the medium storage device 10 through an identification unit 300, a medium identified as a rejection medium in the identification unit 300 may be transferred to a reject cassette part 801 of the transit cassette 800, and the medium stored in the recycle cassette 500 may be recovered to the medium cassette part 802 of the transit cassette 800. Here, the reject cassette part 801 may be separately disposed at one side in the transit cassette 800 to provide a stack space for storing rejection mediums, and the medium cassette part 802 may be separately disposed at the other side in the transit cassette 800 to provide a stack space for storing mediums.

The medium storage device 10 may include a safe 11, a temporary holding unit 100, a reception unit 200, an identification unit 300, a conveyance path, a recycle cassette 500, a reject cassette 600, and a control unit 700.

The safe 11 may provide a storage space for storing mediums therein. In this embodiment, the safe 11 is not limited to a medium storage space, but the safe 11 may include a frame/housing that defines the entire appearance of the medium storage device 10.

The reception unit 200 may be provided in an upper front portion of the safe 11. Here, the front of the safe 11 may be understood as the side (right side of the drawing) where the reception unit 200 through which the deposit and withdrawal of mediums are made by a customer is located. An entrance 12 for replenishment and recovery to which the transit cassette 800 is connectable may be provided at a lower side of the front portion of the safe 11. The entrance 12 may include two inlets. For example, the entrance 12 may include a first entrance 12*a* for replenishment and recovery and a second entrance 12*b* for replenishment and recovery.

When the transit cassette 800 may be a split cassette in which the reject cassette part 801 and the medium cassette part 802 are placed side by side in a horizontal direction, the reject cassette part 801 of the transit cassette 800 may be connected to the first entrance 12*a* and the media cassette part 802 of the transit cassette 800 may be connected to the second entrance 12*b*. Further, the temporary holding unit 100 may be provided in an upper rear portion of the safe 11.

The temporary holding unit 100 may be used for temporarily storing mediums. The temporary holding unit 100 may be connected to an upper conveyance path 410 through a first branch conveyance path 431 to be described later. For example, when it is needed to replenish the medium conveyed from the transit cassette 800, the temporary holding unit 100 may receive the medium from the transit cassette 800 through a fourth branch conveyance path 434, the upper conveyance path 410, and a first branch conveyance path 431, and temporarily store the medium therein.

The reception unit 200 may provide a space in which a medium deposited by a customer is carried, and may provide a space from which a medium that needs to be withdrawn by a customer is taken out. The reception unit 200 may be connected to a first branch conveyance path 431 through a sixth branch conveyance path 436 to be described later. When a customer deposits a medium, the reception unit 200 may transfer the deposited medium to the identification unit 300 through the sixth branch conveyance path 436, the first branch conveyance path 431, and the upper conveyance path 410. In addition, the reception unit 200 may be connected through a seventh branch conveyance path 437 to a front connection point at which the upper conveyance path 410 and a lower conveyance path 420 are connected.

The identification unit 300 may recognize mediums as either a normal medium or a rejection medium, by identifying whether the medium moving along the conveyance path is normal or abnormal. In this specification, the mediums may be divided into the normal medium and the rejection medium. The normal medium is a replenishment medium that needs to be replenished in the medium storage device 10, or an unreplenished medium that needs to be recovered from the medium storage device 10 to the transit cassette 800. The unreplenished medium means a medium which, among the mediums introduced into the medium storage device 10 from the transit cassette 800, is conveyed back to the transit cassette 800 without being accommodated in the recycling cassette 500 or the reject cassette 600. Further, the rejection medium is an abnormal medium which may be a damaged or forged medium, or a paper other than a banknote. For example, the rejection medium may be a torn banknote, a counterfeit note or a receipt. In addition, the rejection medium may include a normal medium that is not damaged in the transit cassette 800 but is damaged while moving along the conveyance path, and a normal medium that is not damaged when it is carried into the recycle cassette 500 but is damaged while it is carried out from the recycle cassette 500 and moved along the conveyance path.

The recycle cassette 500 may store a medium. The medium stored in the recycle cassette 500 may be taken out through the transit cassette 800 when a recovery thereof is required, and the medium may be taken out through the reception unit 200 when a customer requests withdrawal. The medium deposited in the reception unit 200 by a customer's deposit request may be carried into the recycle cassette 500 through the identification unit 300. A plurality of recycle cassettes 500 may be provided. The mediums may be separated and stored in the plurality of recycle cassettes 500 according to the types of mediums.

A sensor (not shown) may be provided in the recycle cassette 500 to maintain a proper amount of mediums per each type according to the types of mediums in preparation for a customer's withdrawal request. The sensor may detect how much mediums is stored in the recycle cassette 500 in real time, and may inform a management company for the medium storage device 10 whether the mediums in the recycle cassette 500 are insufficient.

In the recycle cassette 500, the mediums may be accommodated up to a predetermined amount through the replenishment process of the medium through the transit cassette 800. In other words, when the quantity of mediums in the recycle cassette 500 becomes insufficient, a teller or a person of the management company can replenish the medium storage device 10 with mediums through the transit cassette 800 so that the predetermined amount of mediums are accommodated in the recycle cassette 500.

During the teller or the person of the management company moves to replenish the mediums, a part or all of the amount of mediums to be refilled may be replenished in the recycle cassette 500 of the medium storage device 10 by a customer's deposit.

When the teller or the person of the management company replenishes the mediums after the customer's deposit, the amount of mediums replenished in the transit cassette 800 becomes greater than the amount of mediums that is actually required to be refilled in the medium storage device 10 through the replenishment process.

Meanwhile, in the process of replenishing the mediums through the transit cassette 800, the entire amount of the mediums loaded in the transit cassette 800 may be introduced into the medium storage device 10.

A part of the mediums introduced into the medium storage device 10 may be accommodated in the recycle cassette 500 up to the predetermined amount, and the rest of the mediums introduced into the medium storage device 10 may be returned to the transit cassette 800. The returned mediums may be included in the unreplenished medium.

The reject cassette 600 may store a damaged medium (e.g., rejection medium). The reject cassette 600 may be disposed in a lower front portion of the safe 11 to be positioned adjacent to the transit cassette 800. Since the reject cassette 600 is disposed adjacent to the transit cassette 800, mediums may be rapidly moved between the reject cassette 600 and the transit cassette 800. For example, in the case that a medium which is being transferred from the recycle cassette 500 to the transit cassette 800 is damaged during the transfer and is identified as the rejection medium in the identification unit 300, the rejection medium may be stored in the reject cassette 600.

The conveyance path may convey mediums between the temporary holding unit 100, the identification unit 300, the reception unit 200, the recycle cassette 500, the reject cassette 600, and the transit cassette 800. Such a conveyance path may include a driving roller, a driven roller, a switch gate and the like to transfer the mediums. Further, the conveyance path may be driven by a motor (not shown), and may be controlled by a control unit 700. The conveyance path may include an upper conveyance path 410, a lower conveyance path 420, a first branch conveyance path 431, a second branch conveyance path 432, a third branch conveyance path 433, a fourth branch conveyance path 434, a sixth branch conveyance path 436, and an seventh branch conveyance path 437.

The upper conveyance path 410 may provide a moving path of mediums that are conveyed to/from the identification unit 300. The upper conveyance path 410 may be connected to the lower conveyance path 420 to form a closed loop. The upper conveyance path 410 may be provided above the lower conveyance path 420. The first branch conveyance path 431 may branch from the upper conveyance path 410. The upper conveyance path 410 may convey mediums, transferred from the temporary holding unit 100 or the reception unit 200, through the identification unit 300 to the lower conveyance path 420, or may convey mediums output from the identification unit 300 to the temporary holding unit 100, the reception unit 200 or the lower conveyance path 420.

The lower conveyance path 420 may be connected to the upper conveyance path 410 to form a closed loop. A plurality of second branch conveyance paths 432 may branch from the lower conveyance path 420. In the lower conveyance path 420, a branch point to the reject cassette 600 and a branch point to the recycle cassette 500 may be sequentially placed in the direction toward the front of the safe 11 (where the reception unit 200 is located). The switch gate may be provided at each branch point of the lower conveyance path 420 to be operated under the control of the control unit 700. By adjusting the switch gates under the control of the control unit 700, the lower conveyance path 420 may convey mediums, transferred from the upper conveyance path 410, to the recycle cassette 500, or may convey mediums, transferred from the recycle cassette 500, to the upper conveyance path 410.

The first branch conveyance path 431 may branch from the upper conveyance path 410 to provide a medium moving path between the upper conveyance path 410 and the temporary holding unit 100. The first branch conveyance path 431 may branch upwardly from the upper conveyance path 410. The sixth branch conveyance path 436 may branch from the first branch conveyance path 431. The switch gate operated under the control of the control unit 700 may be provided at a branch point of the first branch conveyance path 431 from which the sixth branch conveyance path 436 branches.

The second branch conveyance paths 432 may branch from the lower conveyance path 420 to provide medium moving paths between the lower conveyance path 420 and the recycle cassettes 500. The second branch conveyance paths 432 may branch forward and downward from the lower conveyance path 420 in the direction toward the front portion of the safe 11.

The third branch conveyance path 433 may branch from a connection point between the upper conveyance path 410 and the lower conveyance path 420. The third branch conveyance path 433 may branch rearward and downward from the lower conveyance path 420 in the direction toward the front of the safe 11. The third branch conveyance path 433 may provide a medium moving path between the upper conveyance path 410 and the reject cassette 600, or a medium moving path between the lower conveyance path 420 and the reject cassette 600, by adjusting the switch gate under the control of the control unit 700.

The fourth branch conveyance path 434 may provide a medium moving path between a front-side connection point of the upper conveyance path 410 and the lower conveyance path 420, and the first entrance 12*a* for first replenishment and recovery. For example, the fourth branch conveyance path 434 may convey a medium, transferred from the medium cassette part 802 of the transit cassette 800, to the upper conveyance path 410, or may convey a medium, transferred from the upper conveyance path 410, to the medium cassette part 802 of the transit cassette 800.

The sixth branch conveyance path 436 may branch from the first branch conveyance path 431 to be connected to the reception unit 200. The sixth branch conveyance path 436 may provide a medium moving path between the reception unit 200 and the temporary holding unit 100, or a medium moving path between the reception unit 200 and the upper conveyance path 410, by adjusting the switch gate under the control of the control unit 700.

The seventh branch conveyance path 437 may branch from the connection point between the upper conveyance path 410 and the lower conveyance path 420 to be connected to the reception unit 200. The seventh branch conveyance path 437 may convey a medium, transferred from the reception unit 200, to the lower conveyance path 420, by adjusting the switch gate under the control of the control unit 700.

The ninth branch conveyance path 439 may provide a medium moving path between the front-side connection point of the upper conveyance path 410 and the lower conveyance path 420 and the second entrance 12*b* for replenishment and recovery. For example, the ninth branch conveyance path 439 may convey a medium, transferred from the lower conveyance path 420, to the reject cassette part 801 of the transit cassette 800.

The switch gates may be provided at branch points of the upper conveyance path 410, the lower conveyance path 420, the first branch conveyance path 431, the second branch conveyance path 432, the third branch conveyance path 433, the fourth branch conveyance path 434, the sixth branch conveyance path 436, the seventh branch conveyance path 437, and the ninth branch conveyance path 439 to switch a medium moving path. The switch gate may change its posture through rotation to selectively determine the medium moving path under the control of the control unit 700.

The control unit 700 may control the conveyance path such that, among mediums conveyed from the medium cassette part 802 of the transit cassette 800, the normal medium is conveyed to the recycle cassette 500 and the rejection medium is conveyed back to the reject cassette part 801 of the transit cassette 800. Further, the control unit 700 may control the conveyance path such that, among the mediums stored in the recycle cassette 500, the normal medium is conveyed to the medium cassette part 802 of the transit cassette 800, and the rejection medium is conveyed to the reject cassette 600. The control unit 700 may be implemented by an operation device including a microprocessor, a measuring device such as a sensor, and a memory. Since the implementation method is obvious to those skilled in the art, a detailed description thereof will be omitted. Hereinafter, the control method of the control unit 700 will be described in detail.

Figure 2:
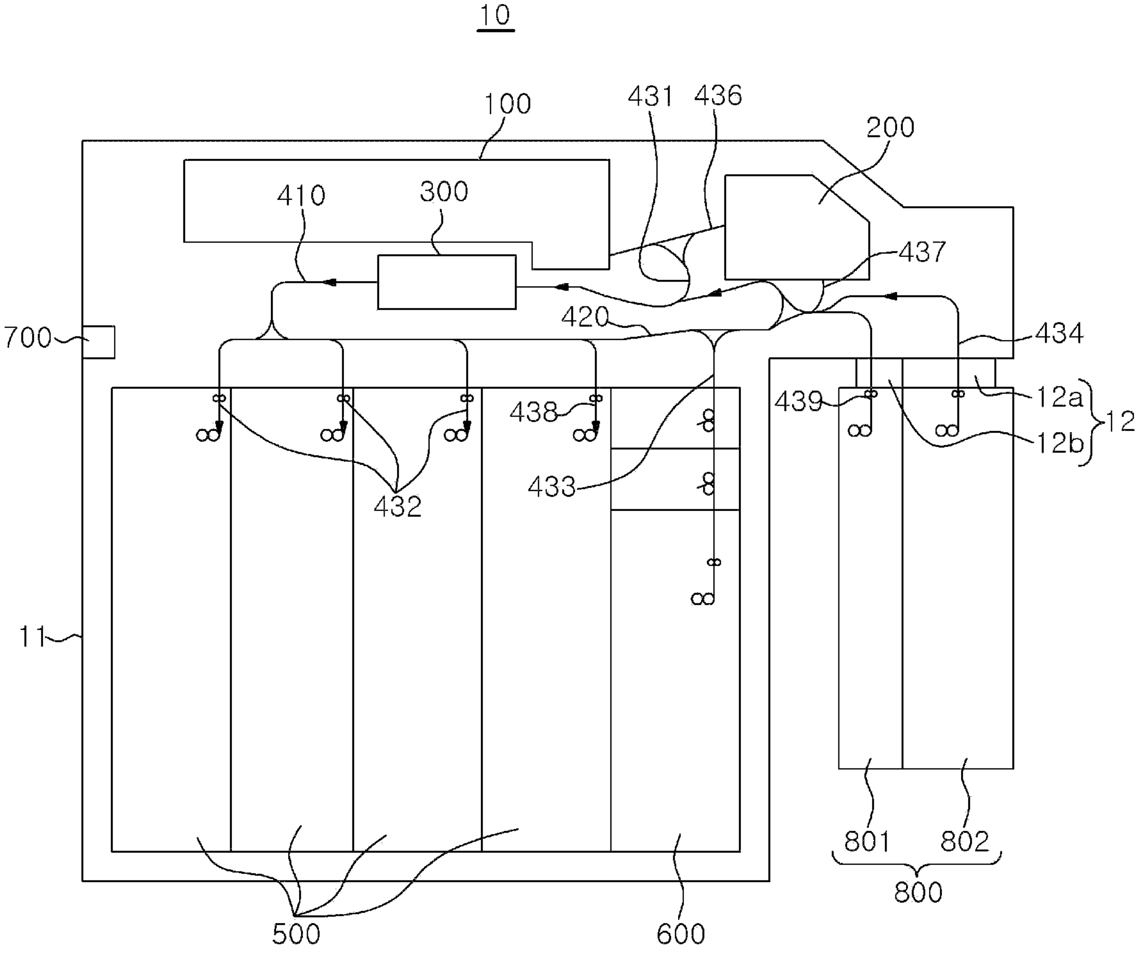
FIG. 2 is a state diagram illustrating a path along which a medium stored in a medium cassette part of a transit cassette is transferred through an identification unit to a recycle cassette, in the medium storage device according to one embodiment of the present disclosure.
Figure 3:
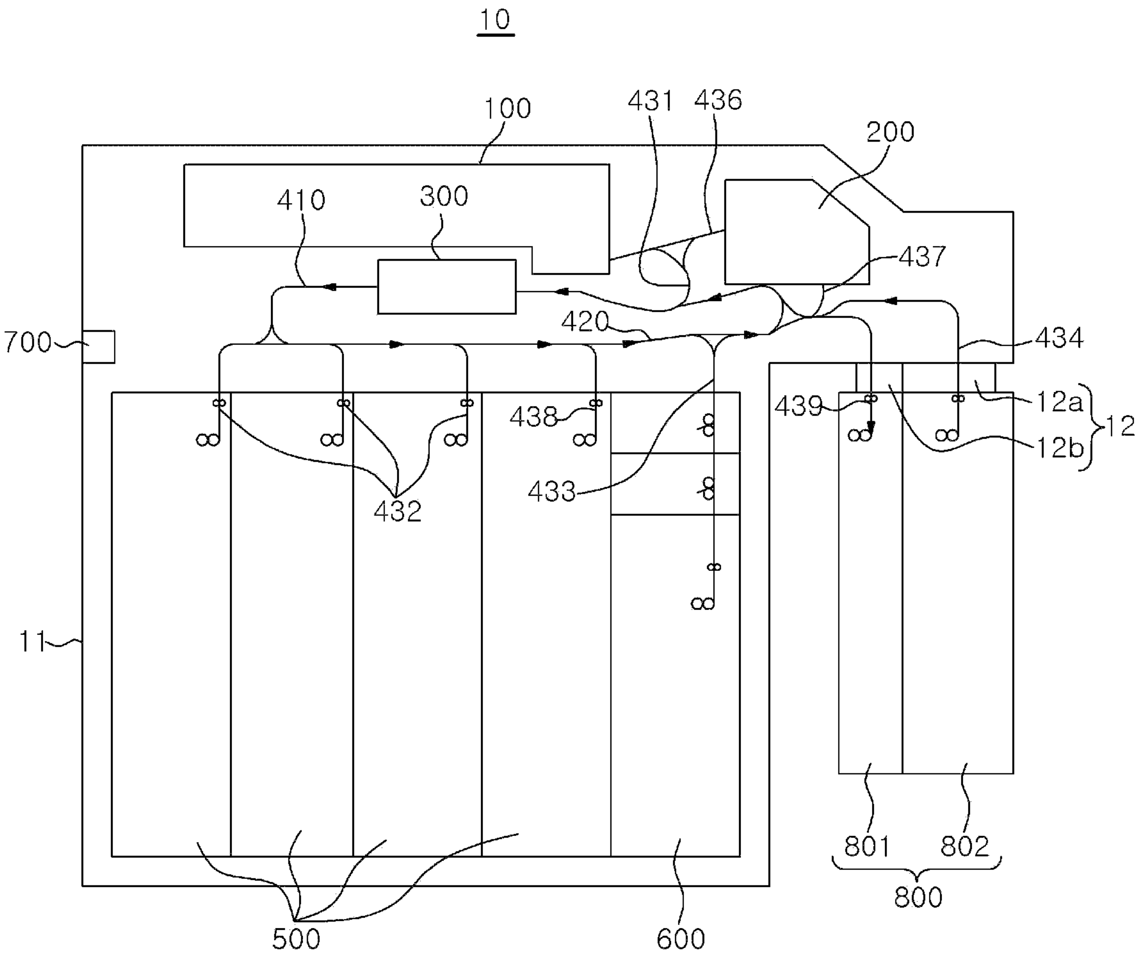
FIG. 3 is a state diagram illustrating a path along which the medium in the transit cassette is transferred through the identification unit to a reject cassette part of the transit cassette, in the medium storage device according to one embodiment of the present disclosure.

Specifically, referring to FIGS. 2 and 3, the control unit 700 may sequentially control the fourth branch conveyance path 434 and the upper branch conveyance path 410 to convey mediums transferred from the medium cassette part 802 of the transit cassette 800 to the identification unit 300. Further, the control unit 700 may control the conveyance path to transfer mediums to different places depending on the types of the mediums identified in the identification unit 300.

For example, as shown in FIG. 2, the control unit 700 may sequentially control the upper conveyance path 410, the lower conveyance path 420 and the second branch conveyance path 432 such that the normal medium identified in the identification unit 300 is conveyed to the recycle cassette 500. Further, as shown in FIG. 3, the control unit 700 may sequentially control the upper conveyance path 410, the lower conveyance path 420 and the ninth branch conveyance path 439 such that the rejection medium identified in the identification unit 300 is conveyed to the reject cassette part 801 of the transit cassette 801. In other words, in the case that the medium being conveyed is damaged and is identified as the rejection medium in the identification unit 300, the control unit 700 may sequentially control the upper conveyance path 410, the lower conveyance path 420 and the ninth branch conveyance path 439 such that the rejection medium is conveyed to the reject cassette part 801 of the transit cassette 800.

Figure 4:
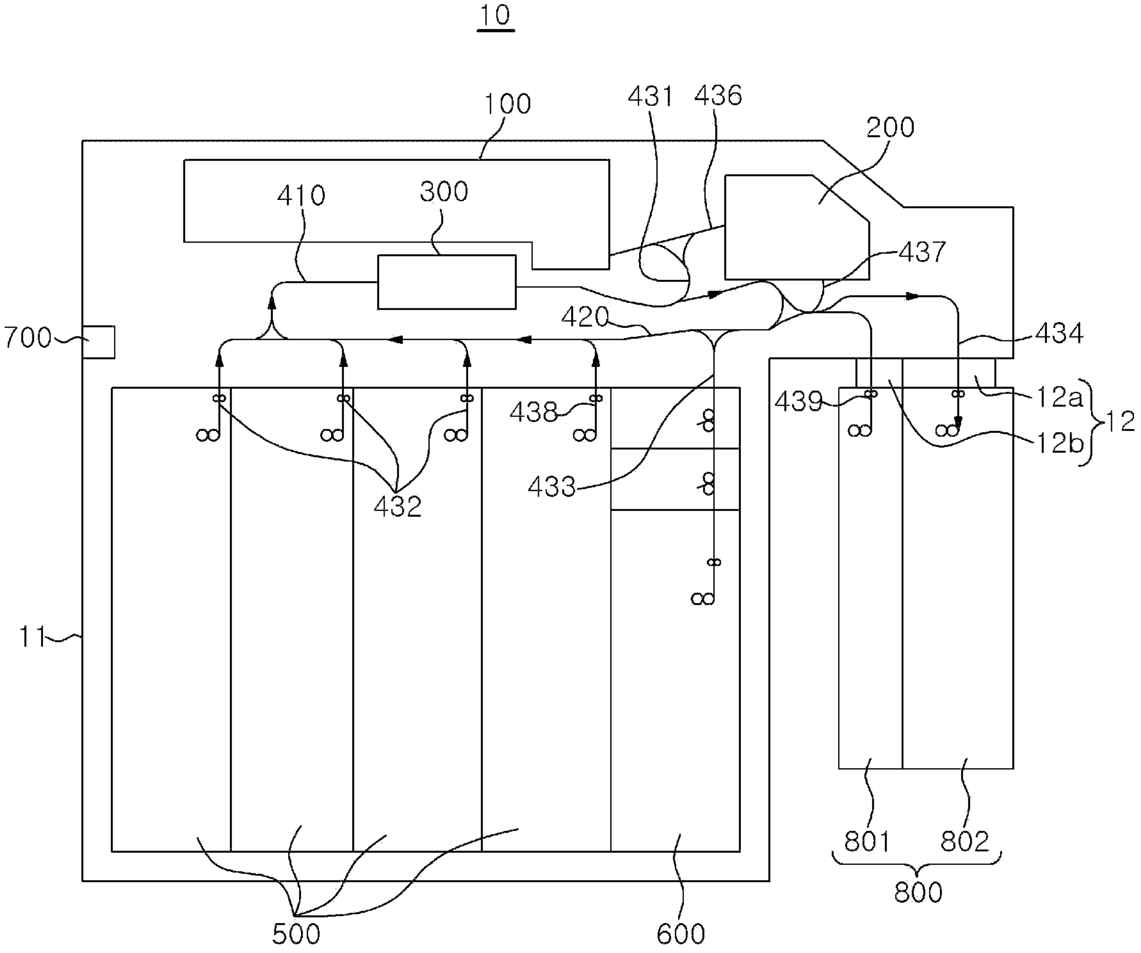
FIG. 4 is a state diagram illustrating a path along which the medium stored in the recycle cassette is transferred through the identification unit to the medium cassette part of the transit cassette, in the medium storage device according to one embodiment of the present disclosure.
Figure 5:
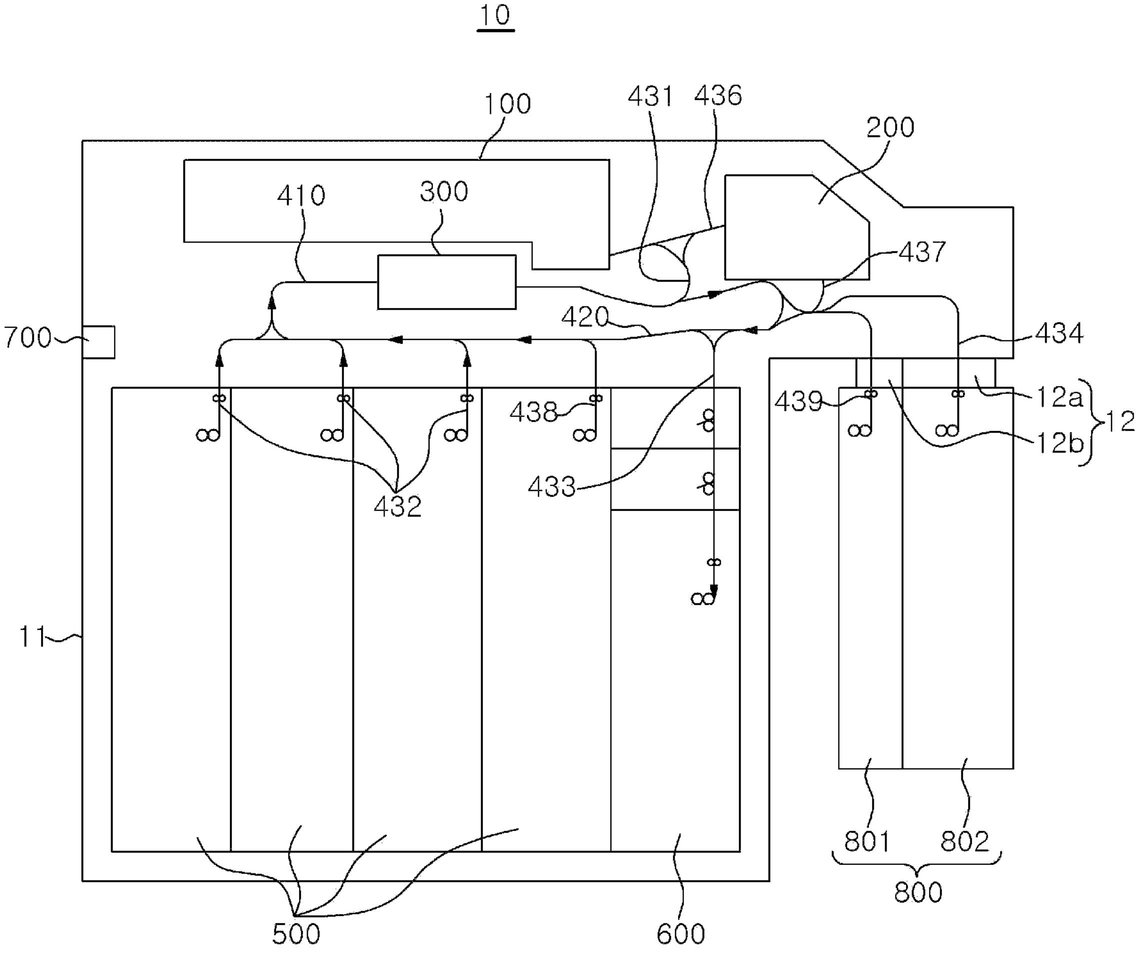
FIG. 5 is a state diagram illustrating a path along which the medium stored in the recycle cassette is transferred through the identification unit to the reject cassette, in the medium storage device according to one embodiment of the present disclosure.

Meanwhile, referring to FIGS. 4 and 5, the control unit 700 may control the second branch conveyance paths 432, the lower conveyance path 420 and the upper conveyance path 410 to convey mediums stored in the recycle cassette 500 to the identification unit 300. Further, the control unit 700 may control the conveyance path to convey mediums to different places depending on the types of the mediums identified in the identification unit 300.

By way of example, as shown in FIG. 4, the control unit 700 may sequentially controls the upper conveyance path 410 and the fourth branch conveyance path 434 such that the normal medium identified in the identification unit 300 is conveyed to the medium cassette part 802 of the transit cassette 800. Further, as shown in FIG. 5, the control unit 700 may sequentially control the upper conveyance path 410, the lower conveyance path 420, and the third branch conveyance path 433 such that the rejection medium identified in the identification unit 300 is conveyed to the reject cassette 600.

Figure 6:
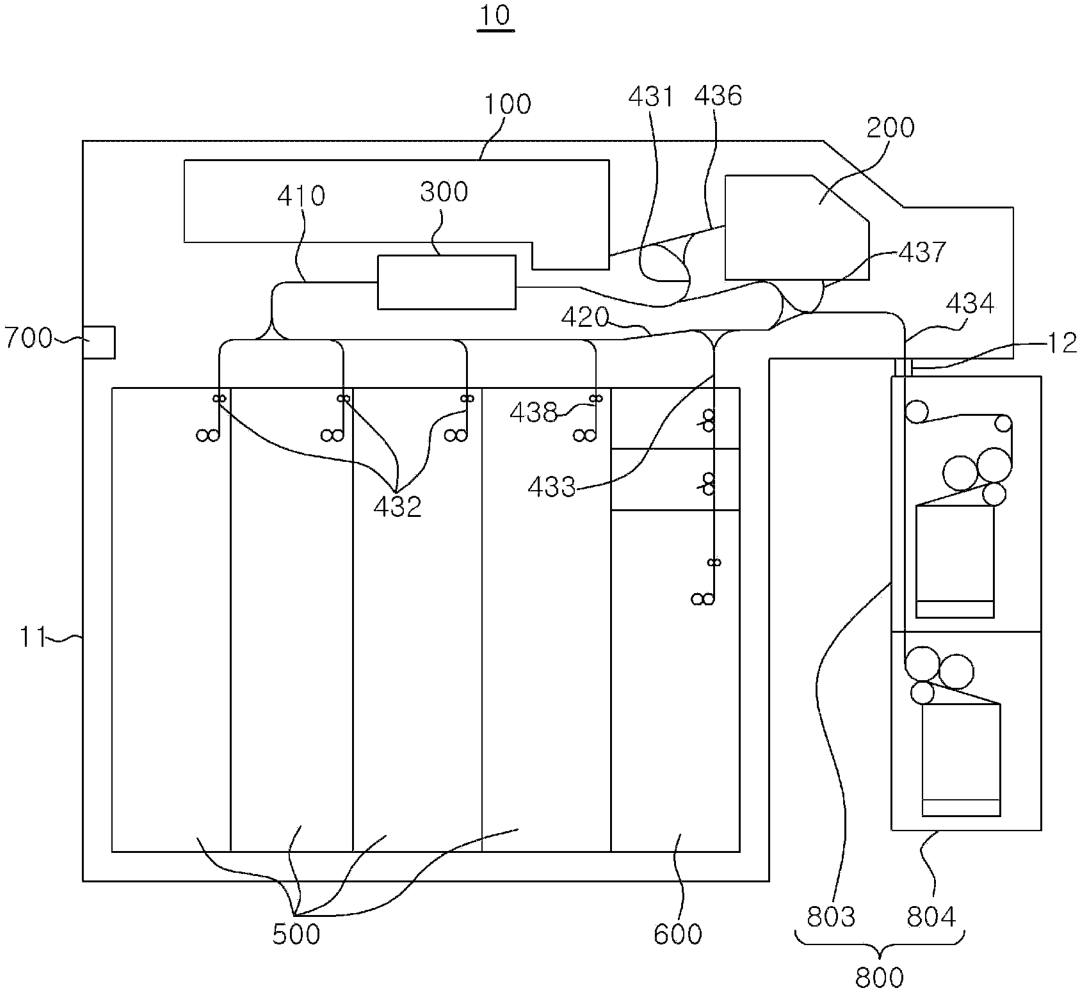
FIG. 6 is a diagram schematically illustrating the configuration of a medium storage device in which a split cassette is installed, according to one modification of the present disclosure.

FIG. 6 shows a modified example of the present disclosure. In the modified example of the present disclosure, the transit cassette 800 may be a split cassette in which an upper cassette part 803 and a lower cassette part 804 are arranged in an up-down direction. An entrance 12 for replenishment and recovery may be provided at a lower side of the front portion of the safe 11 so that the transit cassette 800 is connected to the entrance 12. A required type and number of mediums may be stored in the upper cassette part 803 of the transit cassette 800, and the lower cassette part 804 of the transit cassette 800 may be empty.

In the media storage device 10, the required number and type of mediums may be conveyed from the transit cassette 800 to the recycle cassette 500, and a medium identified as the rejection medium, among the mediums of the transit cassette 800, may be recovered to the transit cassette 800.

For example, the control unit 700 may control the conveyance path such that, among mediums transferred from the upper cassette part 803 of the transit cassette 800, the normal medium is conveyed to the recycle cassette 500 and the rejection medium is transferred back to the lower cassette part 804 of the transit cassette 800. Further, the control unit 700 may control the conveyance path such that, among the mediums in the transit cassette 800, the unreplenished medium may be conveyed back to the lower cassette part 804 of the transit cassette 800.

Further, for the recovery of the mediums in the recycle cassette 500 through the transit cassette 800, the control unit 700 may control the conveyance path such that, among mediums stored in the recycle cassette 500, the normal medium is conveyed to the upper cassette part 803 of the transit cassette 800 and the rejection medium is conveyed to the reject cassette 600.

Further, in order to prevent the collision between the replenishment medium conveyed into the medium storage device 10 from the upper cassette part 803 of the transit cassette 800 and the rejection medium or the unreplenished medium conveyed back to the lower cassette part 804 of the transit cassette 800, the replenishment process of conveying a medium from the upper cassette part 803 to the medium storage device 10 may be temporarily stopped when the medium identified as the rejection medium or the unreplenished medium by the identification unit 300 is conveyed back to the lower cassette part 804 of the transit cassette 800.

For example, when the medium identified by the identification unit 300 as the rejection medium or the unreplenished medium is conveyed back to the lower cassette part 804 of the transit cassette 800, a recovery operation of conveying the medium identified as the rejection medium or the unreplenished medium to the lower cassette unit 804 through the conveyance path may be performed in a state where a replenishment operation of conveying a medium to the medium storage device 10 is temporarily stopped through the conveyance path. After the recovery operation is completed, the replenishment operation may be performed again.

In addition, for the recovery of the medium in the recycle cassette 500 through the transit cassette 800, the control unit 700 may control the conveyance path so that, among the mediums stored in the recycle cassette 500, the normal medium is conveyed to the upper cassette part 803 of the transit cassette 800 and the rejection medium is conveyed to the reject cassette 600.

Hereinafter, in case of replenishing mediums through the transit cassette 800, a method for controlling the medium storage device according to one embodiment of the present disclosure will be described.

Figure 7:
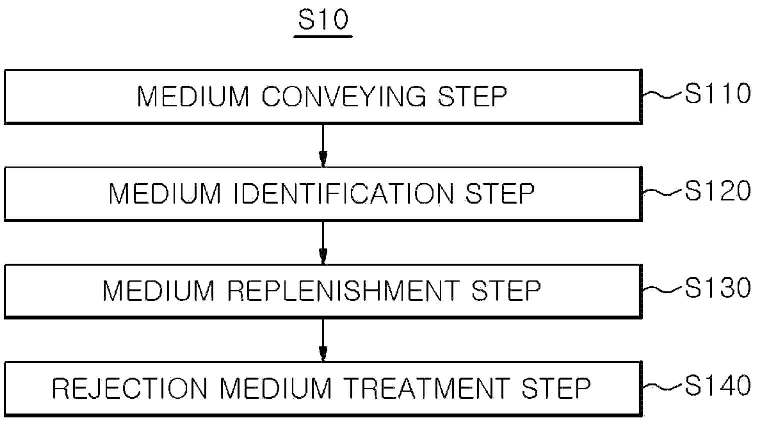
FIG. 7 is a flowchart schematically illustrating a method of controlling the medium storage device in case of replenishing a medium through the transit cassette according to one embodiment of the present disclosure.

Referring to FIGS. 2 and 3, it is possible to provide a method in which a medium stored in the medium cassette part 802 of the transit cassette 800 may be conveyed to and stored in the recycle cassette 500 in the medium storage device 10 through the identification unit 300, and a medium identified as a rejection medium in the identification unit 300 may be conveyed to the reject cassette part 801 of the transit cassette 800. As shown in FIG. 7, the method S10 for controlling the medium storage device 10 may include a medium conveying step S110, a medium identification step S120, a medium replenishment step S130, and a rejection medium treatment step S140.

In the medium conveying step S110, a medium transferred from the medium cassette part 802 of the transit cassette 800 may be conveyed to the identification unit 300. In the medium conveying step S110, the transit cassette 800 may be connected to the entrance 12 for replenishment and recovery provided at the front side of the safe 11 such that the medium in the transit cassette 800 can be carried into the safe 11. In the medium conveying step S110, the medium stored in the medium cassette part 802 of the transit cassette 800 may be transferred to the identification unit 300 through the fourth branch conveyance path 434 and the upper conveyance path 410.

In the medium identification step S120, the medium transferred to the identification unit 300 may be identified and recognized as either a normal medium or a rejection medium. The medium identified as the normal medium in the medium identification step S120 may be transferred to the recycle cassette 500. On the other hand, the medium identified as the rejection medium in the medium identification step S120 may be transferred to the reject cassette part 801 of the transit cassette 800.

In the medium replenishment step S130, the medium identified as the normal medium by the identification unit 300 may be replenished to the recycle cassette 500. In the medium replenishment step S130, the medium identified as the normal medium by the identification unit 300 is conveyed to the recycle cassette 500 through the upper conveying path 410, the lower conveying path 420, and the second branch conveying path 432 (see FIG. 2).

In the rejection medium treatment step S140, the medium identified as the rejection medium by identification unit 300 may be transferred to the reject cassette part 801 of the transit cassette 800. In the rejection medium treatment step S140, the medium identified as the rejection medium by the identification unit 300 is conveyed to the reject cassette part 801 of the transit cassette 800 through the upper conveyance path 410, the lower conveyance path 420, and the ninth branch conveyance path 439 (see FIG. 3).

Hereinafter, when the medium is recovered through the transit cassette 800, a method of controlling the medium storage device according to one embodiment of the present disclosure will be described.

Figure 8:
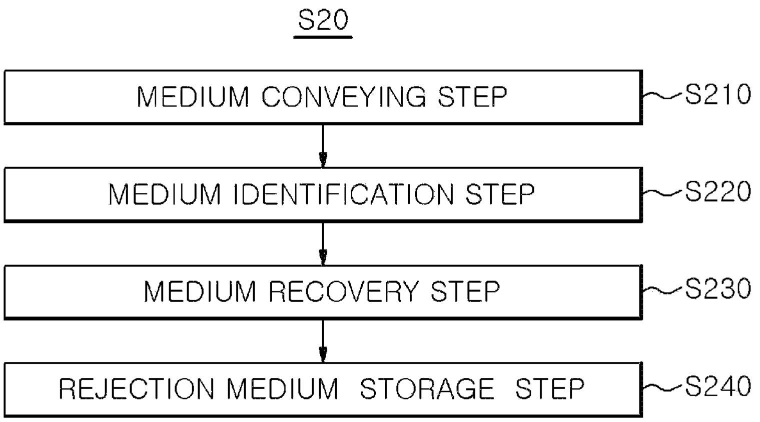
FIG. 8 is a flowchart schematically illustrating a method of controlling the medium storage device in case of recovering a medium through the transit cassette according to one embodiment of the present disclosure.

Referring to FIGS. 4 to 5, in the medium storage device controlling method, a medium stored in the recycle cassette 500 may be recovered to the medium cassette part 802 of the transit cassette 800. As shown in FIG. 8, the method S20 for controlling the medium storage device may include a medium conveying step S210, a medium identification step S220, a medium recovery step S230, and a rejection medium storage step S240.

In the medium conveying step S210, a medium stored in the recycle cassette 500 may be conveyed to the identification unit 300. In the medium conveying step S210, a medium stored in the recycle cassette 500 may be conveyed to the identification unit 300 through the second branch conveyance path 432, the lower conveyance path 420, and the upper conveyance path 410.

In the medium identification step S220, the medium conveyed to the identification unit 300 may be identified and recognized as a normal medium or a rejection medium. In the medium identification step S220, the medium identified as the normal medium may be conveyed to the medium cassette part 802 of the transit cassette 800 for recovery. In the medium identification step S220, the medium identified as the rejection medium may be conveyed to the reject cassette 600.

In the medium recovery step S230, the medium identified as the normal medium by the identification unit 300 may be recovered in the medium cassette part 802 of the transit cassette 810. In the medium recovery step S230, the medium identified as the normal medium by the identification unit 300 may be conveyed to the medium cassette part 802 of the transit cassette 810 through the upper conveyance path 410 and the fourth branch conveyance path 434 (see FIG. 4).

In the rejection medium storage step S240, the medium identified as the rejection medium by the identification unit 300 may be conveyed to and stored in the reject cassette 600. In the rejection medium storage step S240, the medium identified as the rejection medium by the identification unit 300 may be conveyed to the reject cassette 600 through the upper conveyance path 410, the lower conveyance path 420 and the third branch conveyance path 433 (see FIG. 5).

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A medium storage device to which a transit cassette including a reject cassette part for storing a rejection medium and a medium cassette part for storing a medium is connectable, the device comprising:

a safe having one or more entrances for replenishment and recovery to which the transit cassette is selectively connected;

a reception unit through which a customer makes deposits and withdrawals of mediums;

an identification unit serving to identify whether a medium is a normal medium or the rejection medium;

a recycle cassette configured to store the medium identified as the normal medium;

a conveyance path configured to convey the medium between the one or more entrances for replenishment and recovery, the identification unit, and the recycle cassette; and a control unit configured to control the conveyance path such that the medium stored in the medium cassette part is conveyed to the identification unit, and the medium identified as the normal medium in the identification unit is conveyed to the recycle cassette, wherein the one or more entrances include a first entrance and a second entrance, and wherein the reject cassette part and the medium cassette part are directly connectable to the medium storage device through the first entrance and the second entrance, respectively, wherein the safe includes a frame that defines an entire appearance of the medium storage device, wherein the reception unit is disposed in an upper side of a front portion of the frame, and wherein the first entrance and the second entrance are disposed at the front portion of the frame.

2. The medium storage device of claim 1, wherein the control unit is configured to control the conveyance path such that the medium identified as the rejection medium in the identification unit is conveyed to the reject cassette part of the transit cassette.

3. The medium storage device of claim 2, further comprising:

a reject cassette configured to store the rejection medium, wherein the control unit controls the conveyance path such that the medium stored in the recycle cassette is conveyed to the identification unit, the medium identified as the normal medium in the identification unit is conveyed to the medium cassette part of the transit cassette, and the medium identified as the rejection medium in the identification unit is conveyed to the reject cassette.

4. The medium storage device of claim 3, wherein the conveyance path comprises:

an upper conveyance path configured to provide a moving path of the medium conveyed to and from the identification unit;

a lower conveyance path connected to the upper conveyance path to form a closed loop;

a second branch conveyance path providing a medium moving path between the lower conveyance path and the recycle cassette;

a third branch conveyance path providing a medium moving path between the lower conveyance path and the reject cassette;

a fourth branch conveyance path providing a medium moving path between the medium cassette part of the transit cassette and a front-side connection point of the upper conveyance path and the lower conveyance path; and a ninth branch conveyance path providing a medium moving path between the reject cassette part of the transit cassette and the front-side connection point of the upper conveyance path and the lower conveyance path.

5. The medium storage device of claim 4, wherein the control unit is configured to control the fourth branch conveyance path and the upper conveyance path such that a medium stored in the medium cassette part is conveyed to the identification unit, and control the upper conveyance path, the lower conveyance path and the second branch conveyance path such that a medium identified as the normal medium in the identification unit is conveyed to the recycle cassette.

6. The medium storage device of claim 5, wherein the control unit is configured to control the upper conveyance path, the lower conveyance path and the ninth branch conveyance path such that a medium identified as the rejection medium in the identification unit is conveyed to the reject cassette part of the transit cassette.

7. The medium storage device of claim 4, wherein the control unit is configured to control the second branch conveyance path, the lower conveyance path and the upper conveyance path such that a medium stored in the recycle cassette is conveyed to the identification unit, control the upper conveyance path and the fourth branch conveyance path such that the medium identified as the normal medium in the identification unit is conveyed to the medium cassette part, and control the upper conveyance path, the lower conveyance path and the third branch conveyance path such that the medium identified as the rejection medium in the identification unit is conveyed to the reject cassette.

8. The medium storage device of claim 3, wherein the reject cassette is disposed in a lower front portion of the safe to be positioned adjacent to the transit cassette.

9. A method of controlling a medium storage device to which a transit cassette including a reject cassette part for storing a rejection medium and a medium cassette part for storing mediums is connectable, the method comprising:

conveying a medium from the medium cassette part of the transit cassette to an identification unit;

identifying whether the medium conveyed to the identification unit is a normal medium or a rejection medium;

replenishing the medium, identified as the normal medium in the identification unit, to a recycle cassette; and conveying the medium identified as the rejection medium in the identification unit to the reject cassette part of the transit cassette, wherein the medium storage device comprises a safe having one or more entrances for replenishment and recovery to which the transit cassette is selectively connected, wherein the one or more entrances include a first entrance and a second entrance, and wherein the reject cassette part and the medium cassette part are directly connectable to the medium storage device through the first entrance and the second entrance, respectively, wherein the medium storage device includes a reception unit through which a customer makes deposits and withdrawals of mediums, wherein the safe includes a frame that defines an entire appearance of the medium storage device, wherein the reception unit is disposed in an upper side of a front portion of the frame, and wherein the first entrance and the second entrance are disposed at the front portion of the frame.

* * * * *